Jan. 28, 1969  E. G. MUNCK  3,424,306
PACKAGE AND METHOD OF PRODUCING SAME
Filed Jan. 15, 1968  Sheet _1_ of 2
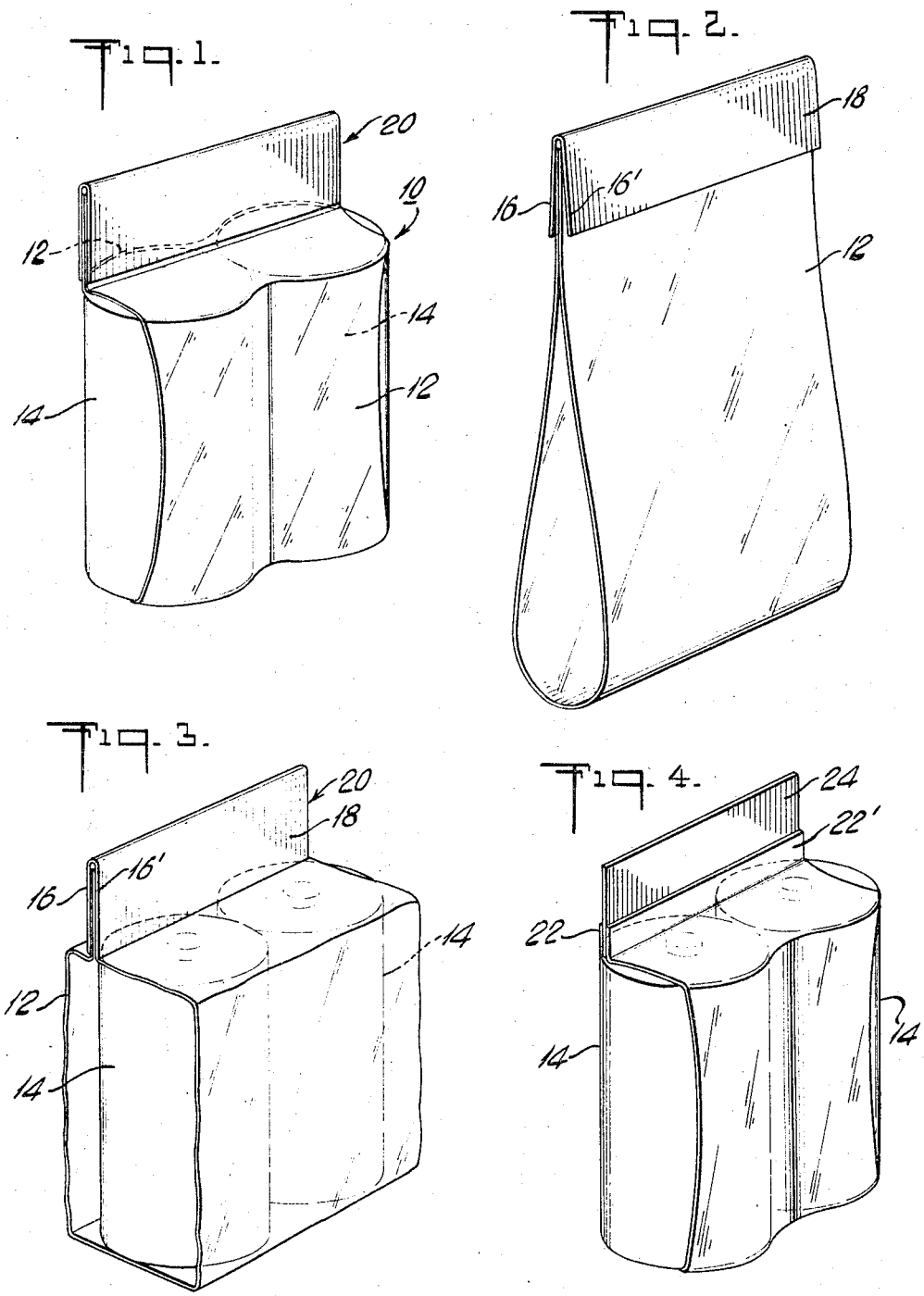
INVENTOR
ELLSWORTH G. MUNCK
BY
ATTORNEY Jan. 28, 1969 E. G. MUNCK 3,424,306
PACKAGE AND METHOD OF PRODUCING SAME
Filed Jan. 15, 1968 Sheet 2 of 2
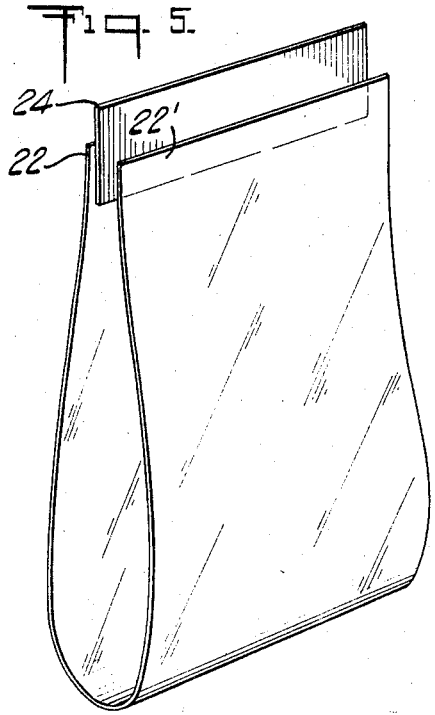
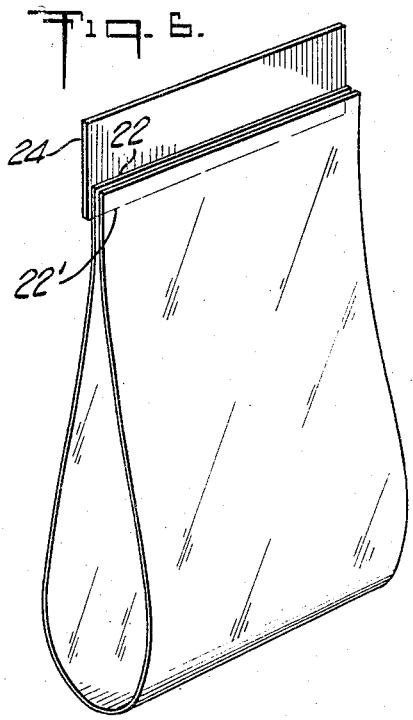
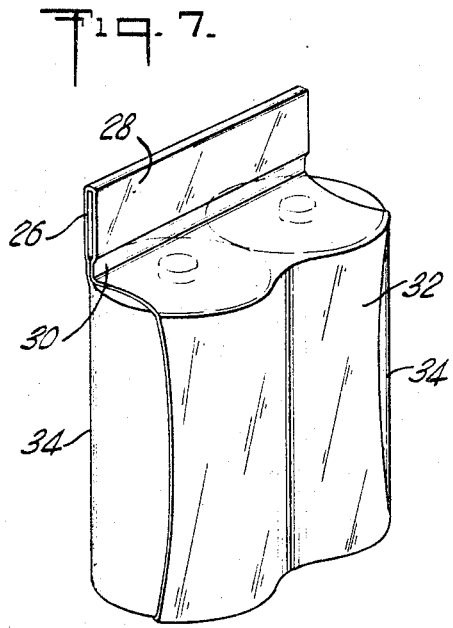
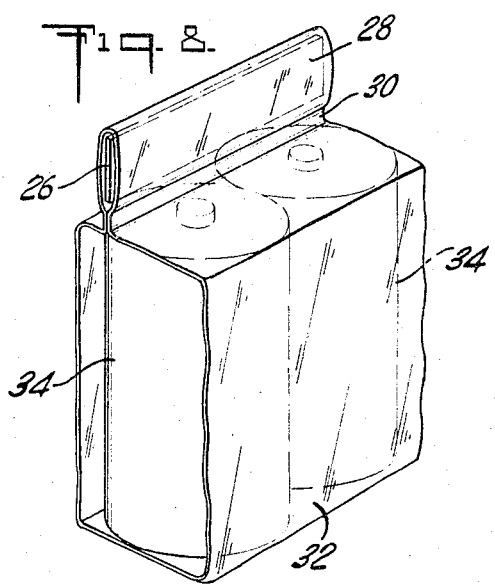
INVENTOR
ELLSWORTH G. MUNCK
BY
ATTORNEY United States Patent Office 3,424,306
Patented Jan. 28, 1969

3,424,306
PACKAGE AND METHOD OF PRODUCING SAME
Ellsworth G. Munck, Parma Heights, Ohio, assignor to Union Carbide Corporation, a corporation of New York
Filed Jan. 15, 1968, Ser. No. 697,957
U.S. Cl. 206—65  9 Claims
Int. Cl. B65d 65/28, 65/38

ABSTRACT OF THE DISCLOSURE

A package having a sheet of thermoplastic material heat shrunk around the package contents and an appendage extending from the body of the package. A header board is positioned in contact with the appendage to limit shrinkage of the appendage during the heat shrinking of the package. The header board also serves as a gripping means which can be twisted to allow easy opening of the package.

---

This invention relates to an improved package and more particularly to a package of the type wherein the package contents are enclosed by a sheet of heat shrunk thermoplastic material. The invention also relates to a method of producing such a package.

The term "thermoplastic" as used herein refers to a material which possesses the property of softening or fusing when heated and of hardening again when cooled.

The term "heat shrinkable" as used herein refers to the property of a film whereby it contracts in length and/or width upon exposure to sufficient heat. Shrinking is generally attributable to a reorientation of molecules which were previously oriented by stretching the film either uniaxially longitudinally (machine direction) or horizontally (transverse direction) or biaxially (both directions). The term "heat shrunk" describes the condition of a heat shrinkable material after application thereto of heat sufficient to cause shrinkage.

It has heretofore been known to package an article by enclosing it in heat shrinkable thermoplastic material and applying heat to shrink the thermoplastic to form a tight package.

Packages of this general type possess several distinct advantages which are not present in packages made from other common packaging materials, for example, paper or cardboard. Heat shrunk packages are typically made from a transparent film which allows the contents to be viewed as would be desirable in the case of a commercial package. The contents of the package are, at the same time, kept clean and marketable even after continuous handling and examination. The instances of pilfering are reduced since several small items can be grouped together into a single larger, and therefore more conspicuous, package. These advantages are particularly desirable in the case of packages containing food products since the package is not weakened when wet and is not permeable to moisture. Also, the fact that the packaged article can be seen will sometimes eliminate the need for printing on a package if the article is readily identifiable when viewed or if the article itself contains descriptive printing or advertising.

These and other advantages have been obtained through the use of a heat shrinkable thermoplastic film. However, the use of such a film has traditionally made these packages difficult to open due to the fact that the thermoplastic sheet fits tightly about the packaged article and is difficult to grasp in a manner which will permit the sheet to be torn. Moreover, the thermoplastics used in such packages are typically plasticized and react elastically to an applied force thereby offering considerable resistance to tear.

It is an object of the present invention to provide a package possessing all the aforementioned desirable properties of a heat shrunk package but which is relatively easy to open.

It is a further object of the invention to provide a heat shrunk package having a gripping tab for use in opening the package, which tab also provides a convenient area for printing and for hanging the package from a display rack.

These and other objects are achieved in a package comprising a strip of thin heat shrinkable thermoplastic material heat shrunk around the package contents and having a heat seal proximate to the contents to form an appendage extending therefrom. A header board of a relatively stiff sheet material is positioned in contact with the appendage and limits shrinkage thereof during the heat shrinking operation.

The method of producing the package of the invention comprises forming a loop of heat shrinkable thermoplastic material, positioning a header board of relatively stiff sheet material opposite the loop proximate to the thermoplastic material, heat sealing the thermoplastic proximate to the header board to form an appendage extending from the loop, positioning the package contents within the loop and heat shrinking the thermoplastic material while maintaining the package contents in proper alignment and the appendage in a position substantially perpendicular to the body of the package.

The package of the invention will be more particularly described with reference to the accompanying drawings in which:

FIGURE 1 is an isometric view of a package in accordance with one embodiment of the invention;

FIGURE 2 shows the manner in which the header board and thermoplastic material are assembled to form the package of FIGURE 1;

FIGURE 3 shows the assembled package of FIGURE 1 prior to heat shrinking;

FIGURE 4 is an isometric view of a package in accordance with another embodiment of the invention;

FIGURE 5 shows the manner in which the header board and thermoplastic material are assembled to form the package of FIGURE 4;

FIGURE 6 shows a variation in the assembly of FIGURE 5;

FIGURE 7 is an isometric view of a package in accordance with another embodiment of the invention; and FIGURE 8 shows the assembled package of FIGURE 7 prior to heat shrinking.

Referring in detail to the embodiment of FIGURES 1-3, there is shown in FIGURE 1 a package generally designated 10, comprising a strip of thin heat shrinkable thermoplastic material 12 heat shrunk around the package contents which, for purposes of exemplification, are depicted as flashlight batteries 14. The two ends 16, 16' of the thermoplastic 12 extend adjacent to each other from the body of the package and are capped by a header board 18 of a relatively stiff sheet material which is heat sealed to the ends 16, 16'. The combination of thermoplastic ends 16 and header board 18 heat sealed thereto forms an appendage generally designated 20 extending from the body of the package.

In the assembly of the package (FIGURE 2), the thermoplastic 12 is folded upon itself in approximate end to end relationship forming a loop of thermoplastic having adjacent free ends 16 opposite the loop. A sheet of relatively stiff material, for example, cardboard, is folded upon itself to form a header board 18 and is positioned to cap the adjacent ends 16 of the thermoplastic. The interior portion of the header board has previously been coated with a heat sensitive adhesive, for example, a vinyl adhesive. The header board 18 is heat sealed to the ends 16 to form the appendage 20 which extends from the loop of thermoplastic. The batteries 14 are then positioned in the loop (FIGURE 3) and the thermoplastic is heat shrunk by any convenient source of heat, for example, a heat tunnel.

The header board, which is bonded to the appendage of of the package, prevents the appendage from shrinking during the heating operation and thereby creates a stress between the shrunken thermoplastic of the body of the package and the unshrunken, heat sealed, thermoplastic of the appendage. This stressed condition allows the thermoplastic to be easily torn along the line of stress. This ease of tearing is also increased by the header board terminating at the line of stress thereby affording a cutting edge in contact with the stressed thermoplastic.

To open the package it is necessary merely to hold the body of the package in one hand and twist the header board with the other.

FIGURE 4 shows a package according to another embodiment of the invention. In this embodiment the adjacent free ends 22, 22' of the thermoplastic material are not encased within a fold of header board, but rather are heat sealed to the exterior of the header board 24. In the package of FIGURE 4 of the free ends 22, 22' are heat sealed to opposite sides of the header board 24 (see FIGURE 5 for detail of assembly). FIGURE 6 shows the assembly of a similar package but having both free ends 22, 22' heat sealed to the same side of the header board 24. The heat sealing in each instance is accomplished prior to heat shrinking, and the resulting stress is the same as that which develops in the package of FIGURES 1–3.

FIGURE 7 shows a package according to another embodiment of the invention. In this embodiment a header board 26 is encased within a tubular compartment 28 of thermoplastic which is separated from the body of the package by a heat seal 30.

The manner of assembling this package is shown in FIGURE 8. A tube of thermoplastic material is heat sealed longitudinally to form two tubular compartments, a first compartment 28 for receiving the header board 26 and a second compartment 32 for receiving the package contents which are again, for purposes of illustration, shown as flashlight batteries 34. The header board 26 and batteries 34 are positioned in their respective compartments and the package is heat shrunk to form a package consisting of a tubular compartment of thermoplastic material containing the package contents and an appendage extending from the compartment.

As in the other embodiments, the header board limits the shrinkage of the appendage and creates a stress along the line of the heat seal. This stress is increased by the limiting effect the batteries have upon the shrinkage of the thermoplastic material of the second compartment. The net result is a package having a line of stress along the heat seal. Exerting a twisting force on the header board will tear the package open along the line of stress.

In each of these embodiments the resulting package will possess all the desirable characteristics of heat shrunk packages, which characteristics have hereinbefore been illustrated, and the package will be relatively easy to open. Other advantages in this type of packaging will be obvious depending upon the nature of the particular article being packaged. For example, when flashlight batteries are packaged in the manner previously described, the terminals of the batteries are kept clean and are protected by the thermoplastic from corrosion.

The thermoplastic material useful in the present invention can be any thermoplastic polymer which, upon application of heat, will contract in length and/or width. The amount of shrinkability in the film is not critical, the only requirement being that the film fit closely to the package contents after shrinking. The thermoplastic material can initially be in the form of a sheet or tube. The thickness of the film is not critical and will depend upon the size, weight and shape of the package contents. It has been found in packaging flashlight batteries, for example, that 3-mil vinyl film is sufficient for a 2-battery package and 5-mil vinyl film is sufficient for a 4 battery package. The film should be one which, upon application of sufficient heat, will form a heat seal with itself, or one which, upon application of sufficient heat and use of a suitable heat reacting adhesive, for example a vinyl alhesive, will form a heat seal with the header board material. Adhesives of this type and their use are well known in the art. The heat seal should be flexible enough to permit the header board to fold flat against the body of the package during shipping and yet should be brittle enough to allow the package to be torn open along the line of stress upon application of a twisting force on the header board.

Particularly desirable packages have been obtained from polyvinyl chloride and its copolymer derivatives, especially copolymers of polyvinyl chloride and vinyl acetate or ethylene, which are highly strained in both directions and contain less than 5% plasticizer. By maintaining a low percentage of plasticizer, or preferably by eliminating the plasticizer entirely, a film is obtained which is more rigid than films which have commonly been used. The rigidity of these films contributes to their ability to tear under a minimum of applied force and therefore enhances their utility in packages of the type described.

The selection of the material from which the header board is made is not critical and, while paperboard or cardboard are preferred, the header board can be made from any sheet material which is relatively stiff. The header board should preferably be of a size which permits it to be grasped easily and, if desired, used as a hanger for the package.

The method of producing the packages of the present invention involves two basic steps, heat sealing and heat shrinking. The method of forming the package of FIGURES 1–3 is described in detail in the following example:

*Example 1*

A sheet of unplasticized polyvinyl chloride-vinyl acetate film measuring approximately 3" x 9½" and having a thickness of 3 mils is folded upon itself transversely in approximate edge to edge relationship. The adjacent edges of the sheet are capped with a cardboard header board measuring approximately 3" x 2" and folded upon itself longitudinally. The inner side of the cardboard is coated with a heat sensitive vinyl adhesive and the cardboard is heat sealed to the edges of the sheet. The heat sealing is accomplished by conduction bars coated with Teflon supplying a temperature of 400° F. for 1 second at 25–35 p.s.i. Two size D batteries are positioned in the resulting pouch and the package is heat shrunk in a heat tunnel. The shrinking temperature ranges from approximately 450° F. at the entrance of the tunnel to approximately 350° F. at the exit. The package remains in the tunnel for approximately 2 seconds. During passage through the tunnel, the batteries are maintained in alignment and the header board is supported in an upright position by two parallel guide rails. The heat shrinking is accomplished in so short a period of time that very little heat is transferred to the package contents. The process can therefore be used to package articles which would be subject to damage by heat.

The packages shown in FIGURES 4–8 can be made in substantially the same manner described above. The variations involved in the process merely concern the manner of assembling the header board prior to the heat sealing operation.

*Experiment 1*

The following test was conducted to determine the resistance to breakage of packages according to the present invention compared to standard paperboard packages.

One standard carton of 96 packages of two size D batteries each was prepared with packages according to the present invention and a similar carton of 96 packages was prepared using a commonly used paperboard gusset package. Both cartons were stored at a temperature of 0° F. for 48 hours and were then dropped 10 times from a height of 18 inches.

Upon examination of the cartons, it was found that there were no broken packages in the carton of packages in accordance with the present invention but that 8 of the 96 paperboard gussets were broken.

This test establishes the superior strength of packages in accordance with the present invention. This strength, combined with the ease with which the package can be opened, has heretofore been unattained in packages of this type.

What is claimed is:

1. A package comprising package contents, a strip of thin heat-shrinkable thermoplastic film folded upon itself in approximate edge to edge relationship heat shrunk around said contents, and a header board of relatively stiff sheet material heat sealed to said edges and limiting shrinkage thereof.

2. A package comprising package contents, a tube of thin heat-shrinkable thermoplastic film, a heat seal dividing said tube into two tubular compartments, and a header board of relatively stiff sheet material positioned in one of said compartments, said package contents being positioned in the other of said compartments and said thermoplastic film being heat shrunk to tightly enclose said package contents and said header board.

3. A package according to claim 1 wherein said edges are heat sealed to opposite sides of said header board.

4. A package according to claim 1 wherein said edges are heat sealed to the same side of said header board.

5. A package according to claim 1 wherein said header board is folded upon itself in approximate end to end relationship enclosing said edges and is heat sealed thereto.

6. A package according to claim 5 wherein the ends of said header board terminate proximate to said package contents.

7. A package according to claim 5 wherein said thermoplastic is a biaxially oriented copolymer derivative of polyvinyl chloride containing less than 5% plasticizer.

8. A package according to claim 7 wherein said copolymer is an unplasticized polyvinyl chloride-vinyl acetate copolymer.

9. A method of producing a package comprising forming a loop of heat shrinkable thermoplastic material, positioning a header board of relatively stiff sheet material opposite said loop, heat sealing said thermoplastic proximate to said header board to form an appendage extending from said loop, positioning the package contents within said loop, and heat shrinking said thermoplastic.

References Cited

UNITED STATES PATENTS

| 3,087,610 | 4/1963 | Kirkpatrick. |
| 3,260,358 | 7/1966 | Gottily et al. _____ 206—46 |

THERON E. CONDON, *Primary Examiner.*